(12) United States Patent
Gorinstein et al.

(10) Patent No.: US 12,729,748 B2
(45) Date of Patent: Sep. 8, 2026

(54) LOW-PROFILE TOROIDAL SLEWING DRIVE

(71) Applicant: LocuDrive Ltd., Ramat Hasharon (IL)

(72) Inventors: Alexander Gorinstein, Netanya (IL); Aleksander Dvorskyy, Haifa (IL)

(73) Assignee: LocuDrive Ltd., Ramat HaSharon (IL)

( * ) Notice: Subject to any disclaimer, the term of this patent is extended or adjusted under 35 U.S.C. 154(b) by 0 days.

(21) Appl. No.: 18/865,713

(22) PCT Filed: May 23, 2023

(86) PCT No.: PCT/IL2023/050530
§ 371 (c)(1),
(2) Date: Nov. 14, 2024

(87) PCT Pub. No.: WO2023/228183
PCT Pub. Date: Nov. 30, 2023

(65) Prior Publication Data

US 2025/0320908 A1 Oct. 16, 2025

Related U.S. Application Data

(60) Provisional application No. 63/344,847, filed on May 23, 2022.

(51) Int. Cl.
*F16H 1/22* (2006.01)
*B25J 9/10* (2006.01)

(52) U.S. Cl.
CPC ................ *F16H 1/22* (2013.01); *B25J 9/102* (2013.01)

(58) Field of Classification Search
CPC ......... Y02E 10/47; Y02E 10/50; Y02E 10/52; Y02E 10/72; H02S 20/32; H02S 30/10; F24S 30/425; F24S 50/20; F24S 2030/136; F24S 2030/11; F24S 2030/134; G01S 3/7861; G05D 3/105; F16H 1/22
See application file for complete search history.

(56) References Cited

U.S. PATENT DOCUMENTS

2011/0132495 A1* 6/2011 Lajoie ........................ F16H 1/22 144/34.1
2022/0099160 A1* 3/2022 Gorinstein .............. F16H 1/125

FOREIGN PATENT DOCUMENTS

CN 2913739 Y 6/2007
CN 202348960 U * 7/2012
CN 204985636 U * 1/2016

* cited by examiner

*Primary Examiner* — Randell J Krug
(74) *Attorney, Agent, or Firm* — Heidi Brun Associates Ltd.; Heidi M. Brun

(57) ABSTRACT

A toroidal slewing drive includes a slewing bearing, a slewing output gear and at least one arc-shaped gear box. The slewing bearing includes an inner ring and an outer ring which move relative to one another. The slewing output gear includes gear teeth between an upper gear slot and a lower gear slot and is mounted on one of the inner ring and the outer ring. The at least one arc-shaped gear box includes a motor, a drive output gear, and a plurality of cluster gears and drives the drive output gear through the plurality of cluster gears. The drive output gear engages the slewing output gear. A portion of at least one of the plurality of cluster gears occupies at least a portion of at least one of the upper gear slot and the lower gear slot.

10 Claims, 7 Drawing Sheets

LOW-PROFILE TOROIDAL SLEWING DRIVE

CROSS REFERENCE TO RELATED APPLICATIONS

This application is a National Phase Application of International Application No. PCT/IL2023/050530 having an international filing date of May 23, 2023 which claims priority from U.S. Provisional Patent application 63/344,847, filed May 23, 2022, which is incorporated herein by reference.

FIELD OF THE INVENTION

The present invention relates to slewing drives generally and to gearing of slewing drives in particular.

BACKGROUND OF THE INVENTION

A slew drive, or a slewing drive, is an assembly that holds radial and axial loads and can apply rotating torque to generate and control the motion of objects or payloads. Slewing drives are a combination of gearing, bearings, seals, housing, a motor and elements that indicate position. They are commonly found in robotics, communications, industrial machinery, medical devices and in aerospace applications. Slewing drives are used to rotate and position systems mounted on a pedestal, such as defense turrets, video surveillance cameras, robotic arms and other systems. Such systems can require highly accurate positioning, and are often heavy and require high torque to rotate them. High levels of torque are difficult to achieve using only a motor, and gearing is usually necessary to increase the output torque of motors. In applications requiring compact actuators, it is often difficult to generate the required high torque to mass ratios, and the required high torque to volume ratios.

SUMMARY OF THE PRESENT INVENTION

There is therefore provided, in accordance with a preferred embodiment of the present invention, a toroidal slewing drive including a slewing bearing, a slewing output gear and at least one arc-shaped gear box. The slewing bearing includes an inner ring and an outer ring which move relative to one another. The slewing output gear includes gear teeth between an upper gear slot and a lower gear slot and is mounted on the inner ring or the outer ring. The at least one arc-shaped gear box includes a motor, a drive output gear, and a plurality of cluster gears. The motor drives the drive output gear through the plurality of cluster gears and the drive output gear engages the slewing output gear. A portion of at least one of the plurality of cluster gears occupies at least a portion of at least one of the upper gear slot and the lower gear slot.

Moreover, in accordance with a preferred embodiment of the present invention, the inner ring encompasses a central passage through which electric cables, fluid pipes, optical cables, or electromagnetic wave guides, passes through.

Further, in accordance with a preferred embodiment of the present invention, the central passage includes slip rings or rotary joints.

Still further, in accordance with a preferred embodiment of the present invention, the at least one arc-shaped gear box is multiple arc-shaped gear boxes mounted equidistantly around the central passage.

Moreover, in accordance with a preferred embodiment of the present invention, when the slewing output gear is mounted on the inner ring, the slewing output gear has external gearing thereon, the at least one arc-shaped gear box is mounted on the outer ring, and the drive output gear engages the slewing output gear from an inner curve of the at least one arc-shaped gear box.

Further, in accordance with a preferred embodiment of the present invention, when the slewing output gear is mounted on the outer ring, the slewing output gear has internal gearing thereon, the at least one arc-shaped gear box is mounted on the inner ring, and the drive output gear engages the slewing output gear from an outer curve of the at least one arc-shaped gear box.

Still further, in accordance with a preferred embodiment of the present invention, the motor is a brushed or a brushless motor.

Moreover, in accordance with a preferred embodiment of the present invention, the motors of the multiple arc-shaped gear boxes are brushless motors and the toroidal slewing drive also includes a single driver to drive the brushless motors.

Further, in accordance with a preferred embodiment of the present invention, a torque or a speed reduction of the toroidal slewing drive is a function of a depth of the upper gear slot and/or the lower gear slot.

Still further, in accordance with a preferred embodiment of the present invention, at least a diameter of the drive output gear is larger than a distance between an outer curve and an inner curve of the at least one arc-shaped gear box and at least a portion of the drive output gear occupies at least a portion of at least one of the upper gear slot and the lower gear slot.

Moreover, in accordance with a preferred embodiment of the present invention, at least a diameter of the at least one of the plurality of cluster gears is larger than a distance between an outer curve and an inner curve of the at least one arc-shaped gear box.

There is also provided, in accordance with a preferred embodiment of the present invention, a toroidal slewing drive including a slewing output gear and an arc-shaped gear box having a volume defined by a distance between an outer curve and an inner curve of the arc-shaped gear box. The arc-shaped gear box includes oversized gears compared to the volume. At least one of the oversized gears is accommodated in at least one gear slot of the slewing output gear, resulting in the inventive toroidal slewing drive having higher torque per volume than an arc-shaped gear box with gears contained within the volume.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
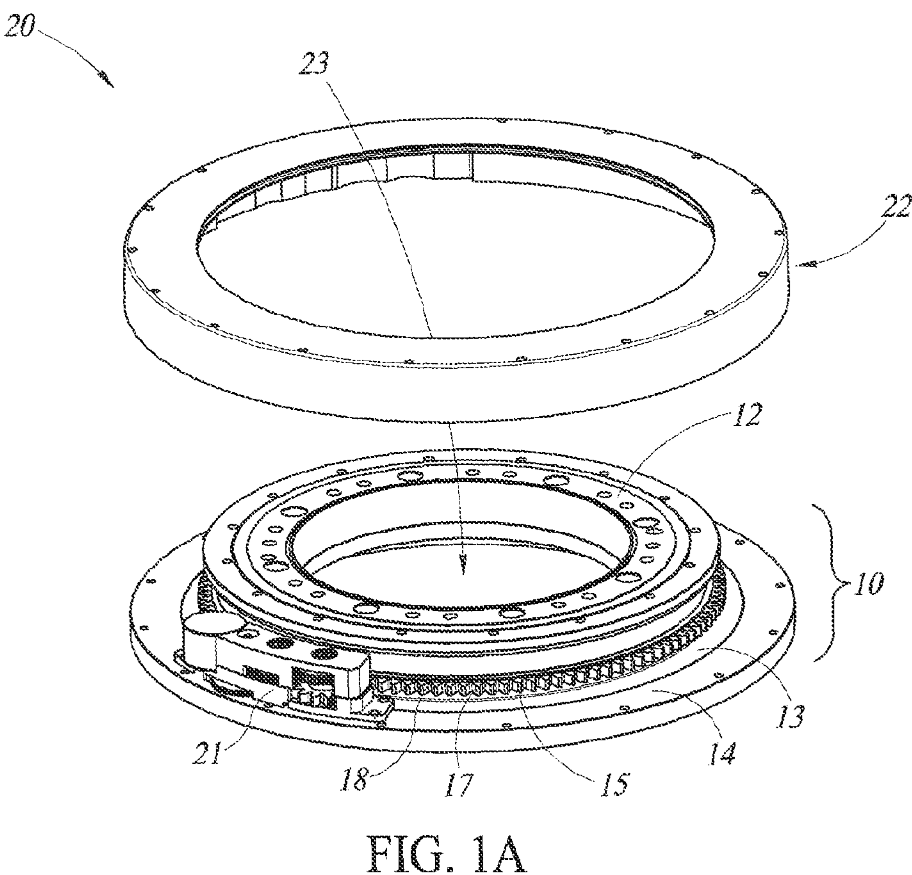
FIGS. 1A and 1B are schematic illustrations of an exemplary low-profile toroidal slewing drive, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that a slewing assembly in toroidal format may be achieved using classic gearing together with slewing bearings in a package which efficiently utilizes the given space.

Applicant has realized that slewing systems which have a compact profile may not only have a smaller volume, but may also have a lower weight. Slewing drives with a 10% smaller radius may have a volume which is 20% smaller and a weight that is 20% lower.

Low-Profile Toroidal Slewing Drive

As a result of tooling requirements, slewing bearings may be manufactured with a slot above and below the output gear teeth. Applicant has realized that similar slots may be made and/or used to accommodate larger diameter drive gears, resulting in a reduced overall diameter slewing drive.

Applicant has also realized that such slots may be added above or below the output gear teeth, or if an existing slot is not of the desired dimensions to accommodate a drive gear, may be resized.

Figure 1B:
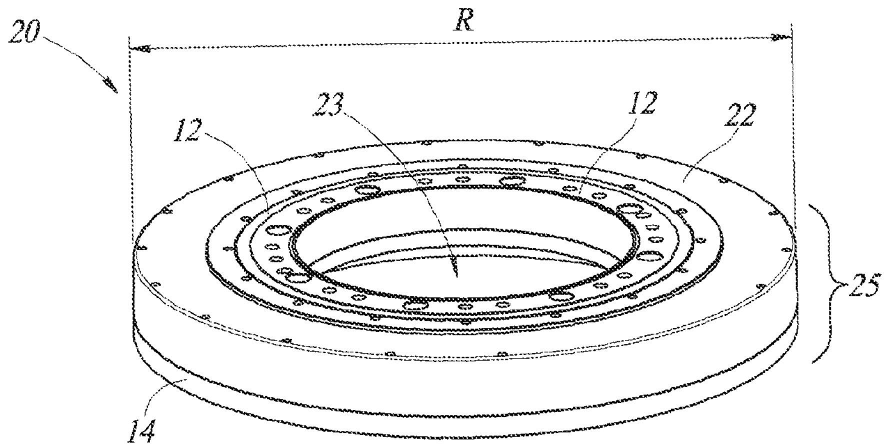

Reference is made to FIGS. 1A and 1B which are schematic illustrations of a low-profile toroidal slewing drive 20. FIG. 1A shows low-profile toroidal slewing drive 20 open, while FIG. 1B shows low-profile toroidal slewing drive 20 closed.

Low-profile toroidal slewing drive 20 comprises a low-profile toroidal slewing bearing 10 enclosing a central passage 23, an arc-shaped gear box 21, and an outer cover 22. Arc-shaped gear box 21 may mesh with and drive low-profile toroidal slewing bearing 10. Arc-shaped gear box 21 may be enclosed by low-profile toroidal slewing bearing 10 and outer cover 22.

Figure 2A:
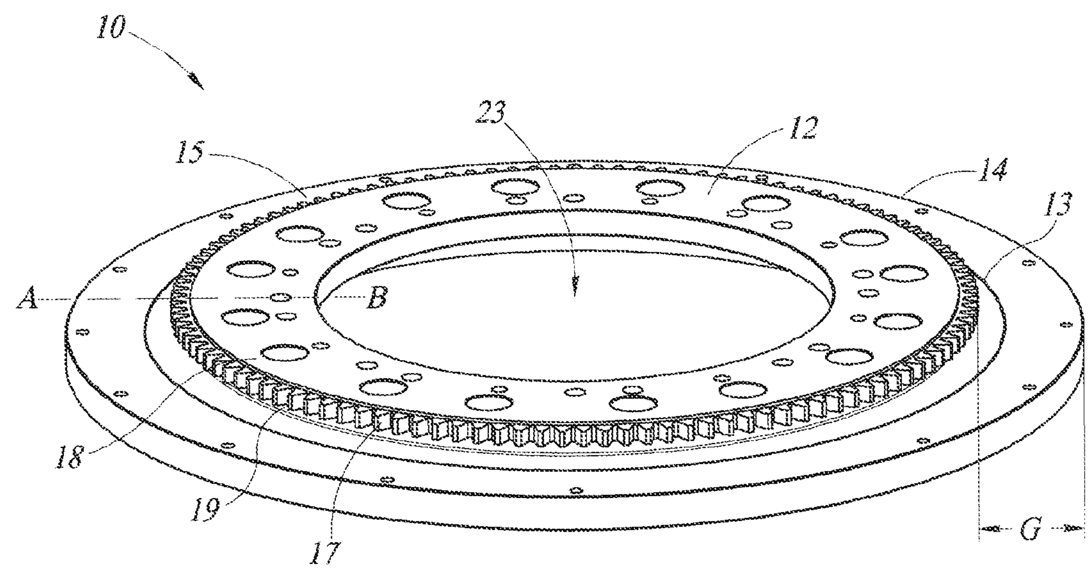
FIGS. 2A and 2B are schematic illustrations of low-profile toroidal slewing bearing of the low-profile toroidal slewing drive of FIG. 1A.
Figure 2B:
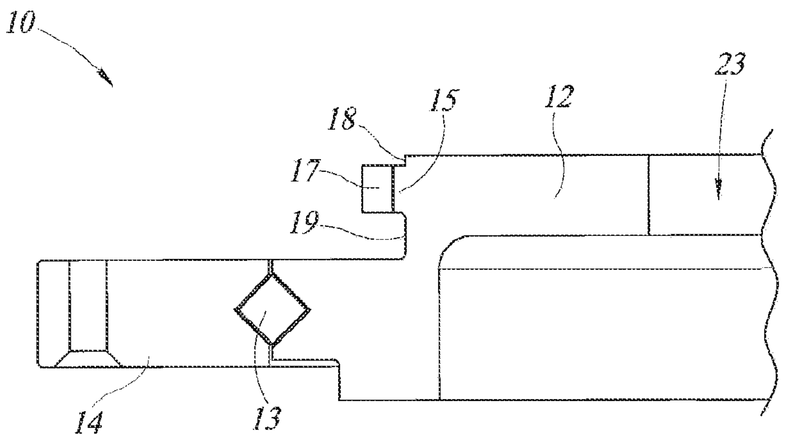

Reference is made to FIGS. 2A and 2B which are schematic illustrations of low-profile toroidal slewing bearing 10 of FIG. 1A. FIG. 2A shows the low-profile toroidal slewing bearing 10, while FIG. 2B shows a cut-away view across line AB of FIG. 2A.

Low-profile toroidal slewing bearing 10 comprises an inner ring 12 extending around central passage 23, an outer ring 14, and a bearing or raceway 13. Inner ring 12 may freely rotate on bearing 13 within outer ring 14. A slewing output gear 15, comprising a set of externally geared teeth 17 (i.e. gear teeth 17 face outwards), may be mounted on inner ring 12. Gear teeth 17 may have a spur, helix or double helix (herringbone) profile.

As shown in FIG. 2B, slewing output gear 15 may have an upper gear slot 18 above gear teeth 17, and a lower gear slot 19 below gear teeth 17. Upper gear slot 18 and lower gear slot 19 may be used to accommodate drive gears of arc-shaped gear box 21 of FIG. 1A, as described in more detail hereinbelow. Arc-shaped gear box 21 may be attached to outer ring 14 of low-profile toroidal slewing bearing 10, and may mesh with externally geared teeth 17 of slewing output gear 15. Arc-shaped gear box 21 may drive inner ring 12. Outer cover 22 may be fixed to outer ring 14 to form an outer housing assembly 25 (FIG. 1B).

Figure 3:
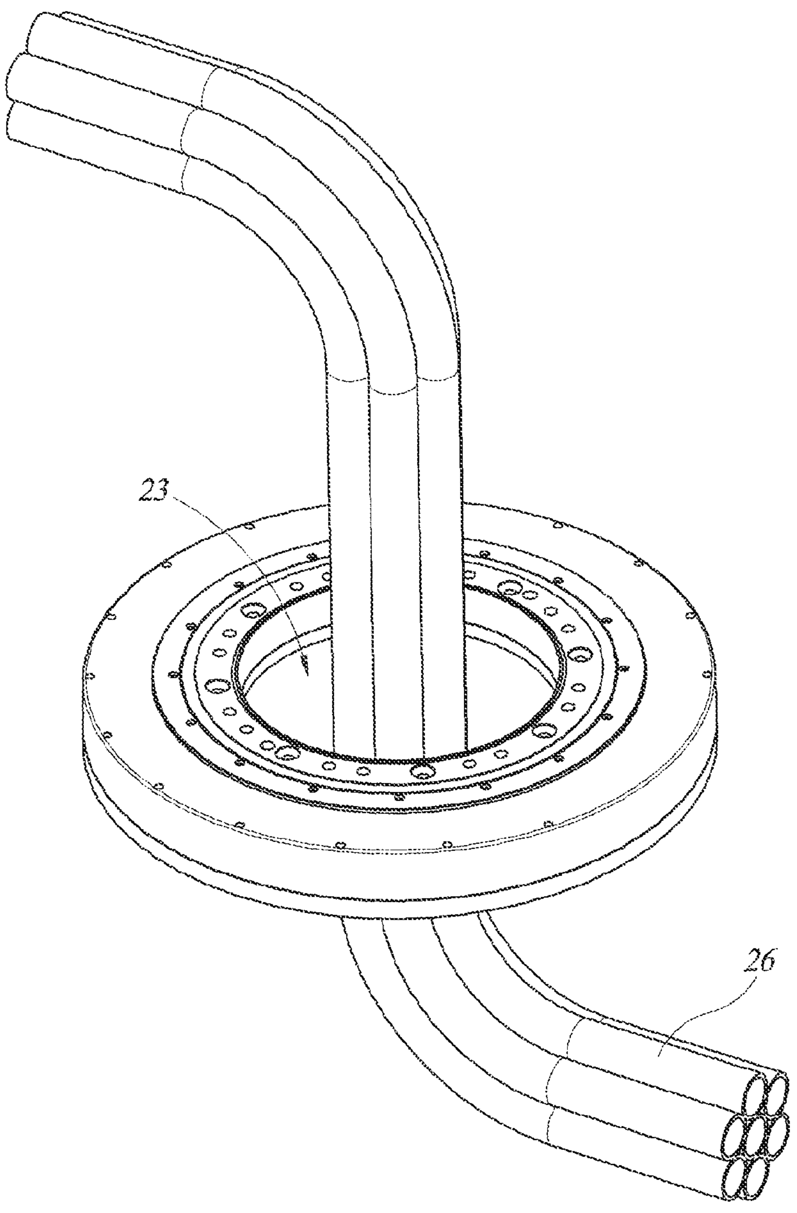
FIG. 3 is a schematic illustration of cables passing through the low-profile toroidal slewing drive of FIG. 1A.

It will be appreciated that systems mounted on a slewing assembly, such as low-profile toroidal slewing drive of FIG. 1A, may require electric cables, fluid pipes, optical cables, electromagnetic wave guides, slip rings and other physical objects to be mounted on and/or pass through the slewing assembly to the mounted equipment. FIG. 3 shows how a cable 26 may pass through central passage 23. Central passage 23 may be in a cylindrical form in order to allow the integration of slip rings for current transmission or rotary joints for waveguide and fluid transmission.

Figures 4A, 4B:
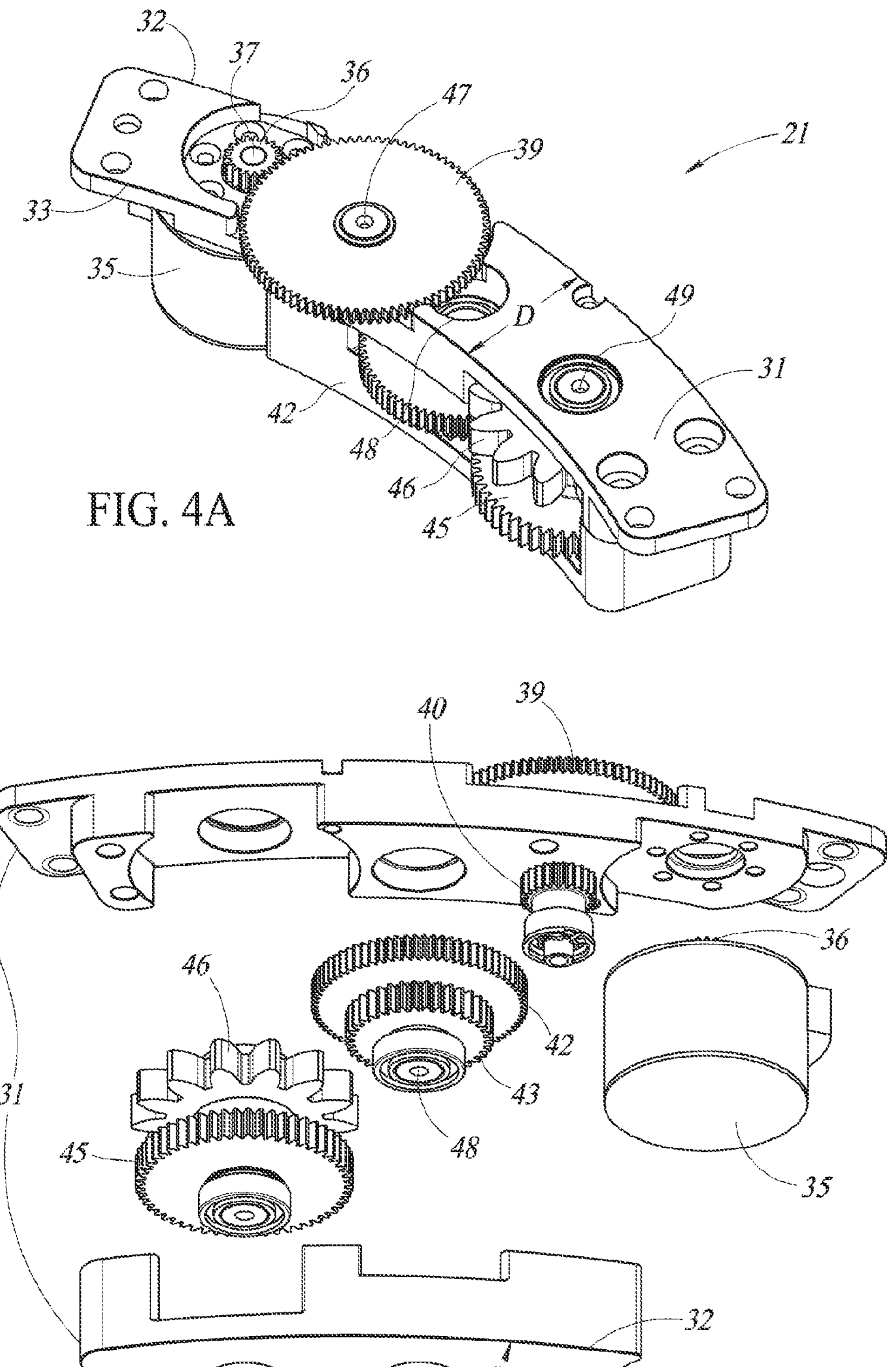
FIGS. 4A and 4B are schematic illustrations of the arc-shaped gear box of the low-profile toroidal slewing drive of FIG. 1A.

Reference is made to FIGS. 4A, and 4B which are schematic illustrations of arc-shaped gear box 21. FIG. 4A is a top view and FIG. 4B is an exploded view.

Arc-shaped gear box 21, as shown in FIG. 4A, comprises a housing 31, which is bound by an outer edge 32 and an inner edge 33. A distance D, between outer edge 32 and inner edge 33, may be minimized such that it may be compact to fit curved or circular profiles, such as that of low-profile toroidal slewing drive 20 of FIG. 1A.

Arc-shaped gear box 21 comprises a motor 35, a pinion 36 attached to a shaft 37 of motor 35, a cluster gear 39, a pinion 40 attached via a shaft 47 to cluster gear 39, a cluster gear 42, a pinion 43 attached via a shaft 48 to cluster gear 42, a cluster gear 45, and a drive output gear 46 attached via a shaft 49 to cluster gear 45. Drive output gear 46 may engage slewing output gear 15 to drive low-profile toroidal slewing drive 20.

It will be appreciated that arc-shaped gear box 21 comprises several cluster gears and pinions meshing each other which together reduce the speed and increase the torque of motor 35. Motor 35 drives cluster gear 39 with pinion 36. Assuming pinion 36 has a quantity Z6 of gear teeth, cluster gear 39 has a quantity Z7 of gear teeth, then the first speed reduction ratio $r_1$ is $$r_1 = \frac{Z6}{Z7}.$$

The first torque increase ratio is $$t_1 = \frac{Z7}{Z6}.$$

Similarly, according to the ratio between teeth counts of subsequent pinions and cluster gears, there may be an additional reduction in speed and an associated increase in torque of motor 35.

It will be appreciated that, as the gear teeth ratio between a cluster gear and its associated pinion increases, the resulting speed reduction and torque may increase.

Applicant has realized that the total torque ratio of an arc-shaped gear box may be limited by the diameter of cluster gears that may fit in a space G between a slewing drive cover and a slewing bearing inner gear as shown in FIG. 2A.

Figure 5:
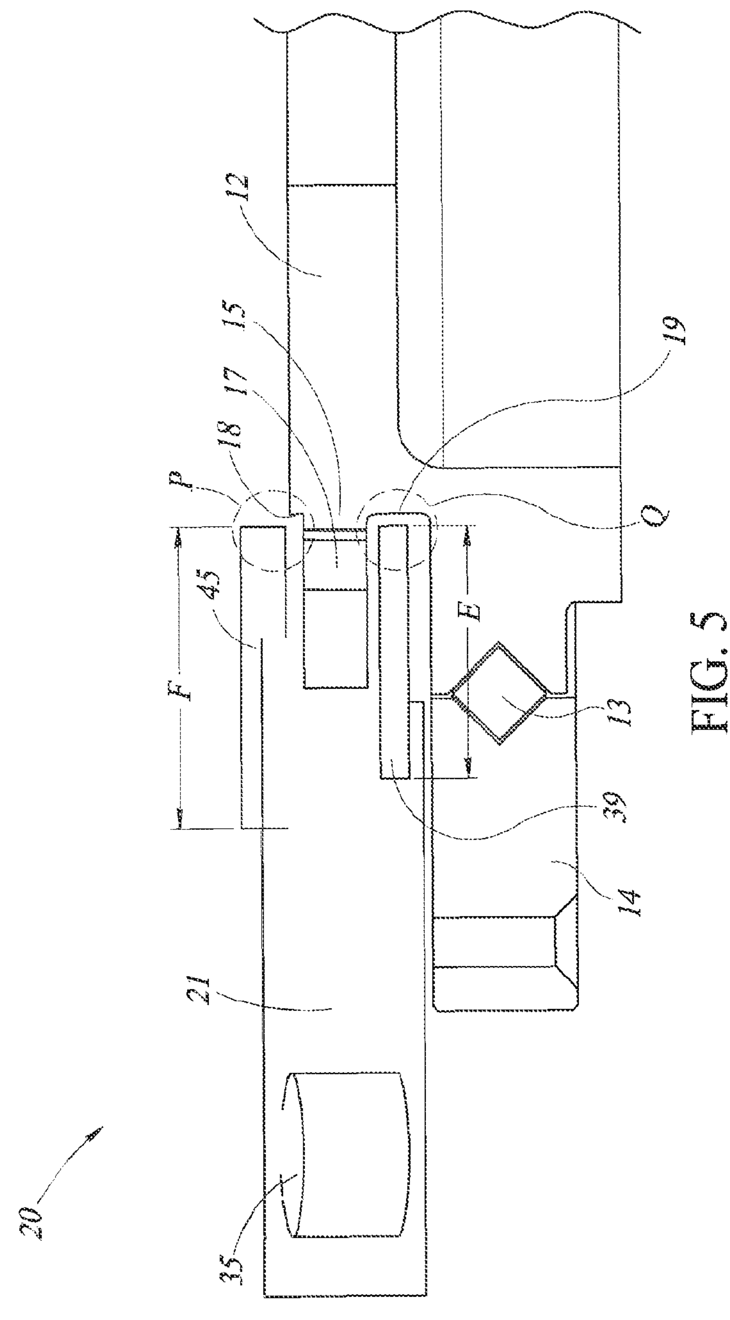
FIG. 5 is a schematic illustration of gear meshing of the low-profile toroidal slewing drive of FIG. 1A.

Applicant has realized that a portion of the diameter of cluster gears that are larger than the space G, may be positioned in upper gear slot 18 and a lower gear slot 17. Reference is briefly made to FIG. 5 which is a schematic illustration of arc-shaped gear box 21 meshing with gear teeth 17 of slewing output gear 15. Cluster gear 39 has a diameter E and cluster gear 45 has a diameter F, which may be larger than space G between slewing drive cover 22 and slewing output gear 15. Applicant has realized that, in order to fit arc-shaped gear box 21 between slewing drive cover 22 and slewing output gear 15, a portion P of cluster gear 45 may be inserted into upper gear slot 18 and a portion Q of cluster gear 39 may be inserted into lower gear slot 19. It will be appreciated that an increased diameter E of cluster gear 39 may be accommodated by increasing the depth of lower gear slot 19, and so, too, for diameter F of cluster gear 39 and upper gear slot 18.

It will be appreciated that by locating portion P of cluster gear 45 in upper gear slot 18, and portion Q of cluster gear 39 in lower gear slot 19 that a diameter R of low-profile slewing drive 20 (as shown in FIG. 1B) may be reduced compared to the diameter of a slewing drive with cluster gears positioned solely in gap G between slewing drive cover 22 and slewing output gear 15 as discussed hereinabove.

It will be appreciated that low-profile slewing drive 20 may have a higher torque ratio than a traditional slewing drive of the same dimensions. For example, the torque ratio of drive 20 may be in the range of 1:3 to 1:1000.

Alternate Low-Profile Slewing Drive

In an alternate embodiment, an alternate arc-shaped gear box may be affixed to inner ring 12 rather than to outer ring 14 as in the previous embodiment. The alternate arc-shaped gear box may be similar to arc-shaped gear box 21 except that the gearing may be switched from external to internal gears. Accordingly, the slewing output gear 15 may be attached to outer ring 14 and may be internally geared (i.e. the gear teeth face inwards) and the drive outer gear may be an internal gear. In this embodiment, the outer cover may be connected to inner ring 12.

Multiple Arc-Shaped Drive Units

It will be appreciated that by increasing the number of arc-shaped gear boxes in a low-profile slewing drive, the torque ratio, angular positioning accuracy and backlash characteristics may be improved relative to a low-profile slewing drive with one arc-shaped gear box.

Figure 6A:
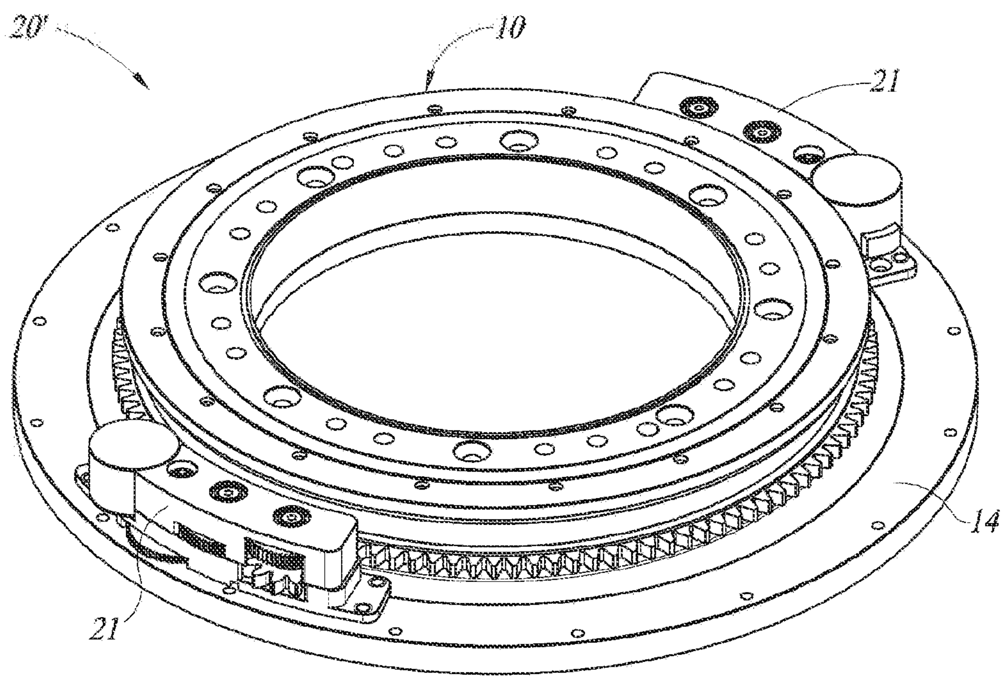
FIG. 6A is a schematic illustration of an alternate embodiment of the low-profile toroidal slewing bearing of FIG. 1A with 2 arc-shaped gear boxes.
Figure 6B:
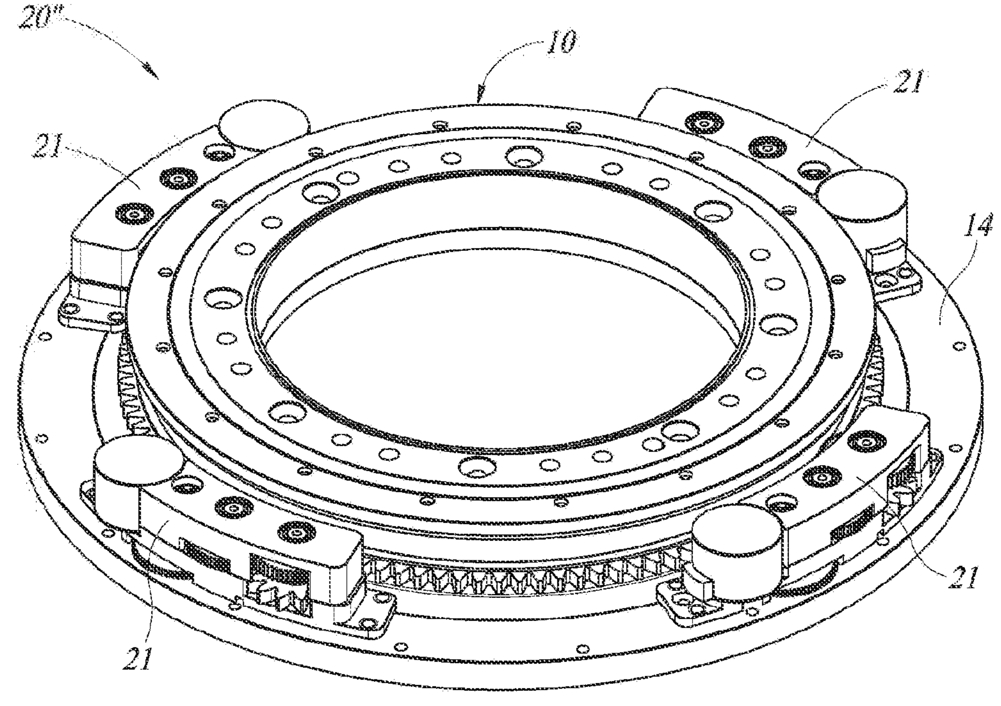
FIG. 6B is a schematic illustration of an alternate embodiment of the low-profile toroidal slewing bearing of FIG. 1A with 4 arc-shaped gear boxes.

In an alternate embodiment, as shown in FIG. 6A, a low-profile toroidal slewing drive 20' may comprise 2 arc-shaped gear boxes 21 placed on opposite sides of outer ring 14 of low-profile toroidal slewing bearing 10. In another alternate embodiment, as shown in FIG. 6B, a low-profile toroidal slewing drive 20" may comprise 4 arc-shaped gear boxes 21 that may be placed at 90 degree offsets around outer ring 14 of a low-profile toroidal slewing bearing 10. It will be appreciated that multiple arc-shaped gear boxes 21 may positioned at any offsets around outer ring 14 of a low-profile toroidal slewing bearing 10. It will also be appreciated that the number of arc-shaped gear boxes 21 may be odd or even. It will be appreciated that when multiple arc-shaped gear boxes 21 are placed equidistantly around outer ring 14 that slewing bearing 10 may be balanced, whereas when they are not placed equidistantly, slewing bearing 10 may become unbalanced.

It will be appreciated that motors 35 (FIG. 4A) may be brushed motors or brushless electric motors, where multiple brushless motors may be advantageous.

Brushless motors are different from brushed dc motors by the fact that the magnetic field in the brushless motor is created by an electrically switched magnetic field while brushed dc motors create their magnetic field through mechanical switching of the brushes.

Brushless motors have sets of windings, where each winding creates its own magnetic field. They usually have 2 or 3 phases. Moreover, brushless motors have magnetic poles which are permanent magnets.

Brushless motors require drivers which switch currents to create the magnetic fields. Brushless motors also comprise feed back units (such as Hall sensors or encoders) which give feedback to their drivers to control the current and thus, the magnetic field.

The driver may be installed inside low profile toroidal slewing drive 20 or may be external to it and be connected by wires.

Applicant has realized that the multiple similar arc shaped gear boxes 21 in FIGS. 6A and 6B are mechanically synchronized and thus, their control may be significantly simplified. Applicant has realized that feedback from only one motor may be sufficient to control all of the motors, as all the phases of the motors can be connected in parallel allowing to control such system by one driver instead of N drivers. This is shown in FIG. 7 to which reference is now made.

Figure 7:
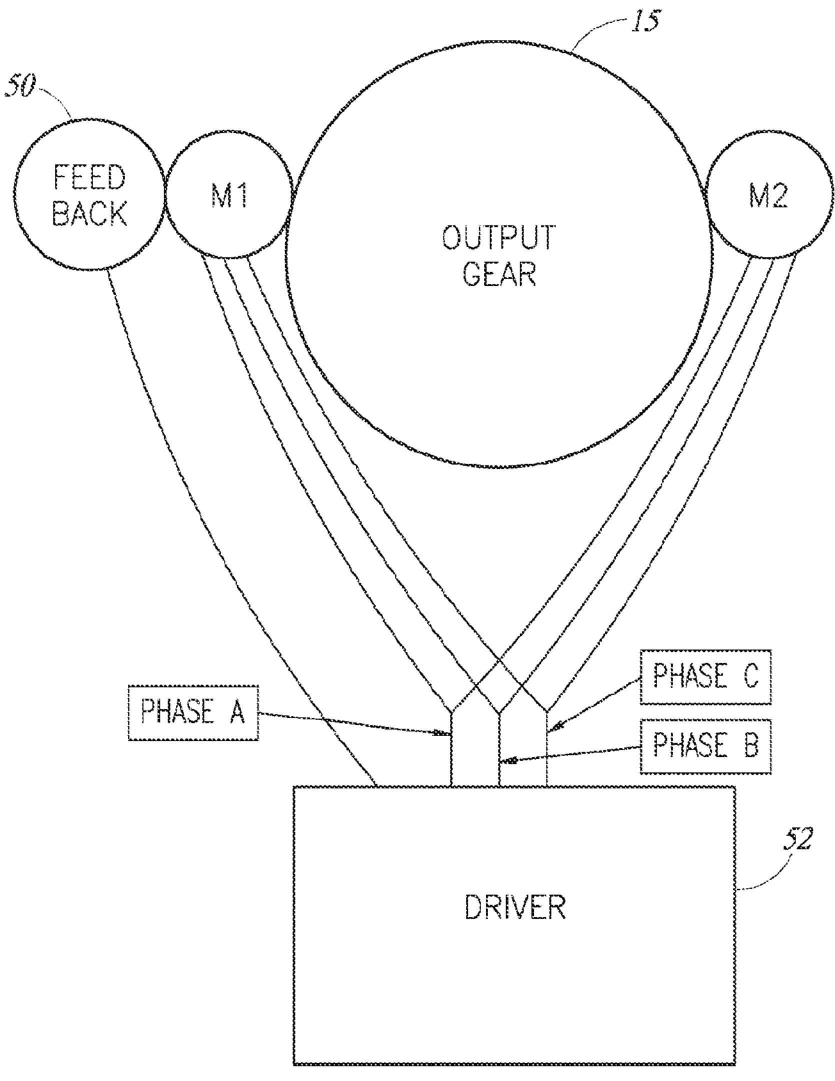
FIG. 7 is a schematic illustration of a single driver control system for the motors of the multiple gear box embodiments of FIGS. 6A and 6B.

FIG. 7 shows two exemplary motors M1 and M2, forming part of two arc shaped gear boxes 21 driving slewing output gear 15. Motor M1 has a feedback unit 50 mechanically connected thereto and communicating, via wires or wirelessly, with an external driver 52. Driver 52 may utilize the feedback signal from feedback unit 50 to control the three phases of the power to both motors M1 and M2.

It will be appreciated that external driver 52 may control more than the two motors M1 and M2 shown in FIG. 7. For example, it may control the four motors of the four arc-shaped gear boxes 21 of FIG. 6B.

In this embodiment, brushless motors 35 may have the same number of magnetic poles and the same number of phases.

It will be appreciated that this embodiment significantly simplifies control over the set of motors in the unit. Only one driver 52 is required.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A toroidal slewing drive comprising:

a slewing bearing comprising an inner ring and an outer ring, said inner ring and said outer ring movable relative to one another;

a slewing output gear comprising gear teeth between an upper gear slot and a lower gear slot, said slewing output gear mounted on one of said inner ring and said outer ring;

at least one arc-shaped gear box comprising a motor, a drive output gear, and a plurality of cluster gears, said motor driving said drive output gear through said plurality of cluster gears;

wherein said drive output gear engages said slewing output gear; and wherein a portion of at least one of said plurality of cluster gears occupies at least a portion of at least one of said upper gear slot and said lower gear slot.

2. The toroidal slewing drive according to claim 1 and wherein said inner ring encompasses a central passage through which at least one of: electric cables, fluid pipes, optical cables, and electromagnetic wave guides, passes through.

3. The toroidal slewing drive according to claim 2 and wherein said central passage comprises at least one of: slip rings and rotary joints.

4. The toroidal slewing drive according to claim 2 and wherein said at least one arc-shaped gear box is multiple arc-shaped gear boxes mounted equidistantly around said central passage.

5. The toroidal slewing drive according to claim 4 wherein said motors of said multiple arc-shaped gear boxes are brushless motors and also comprising a single driver to drive said brushless motors.

6. The toroidal slewing drive according to claim 1 and wherein:

said slewing output gear has external gearing thereon when said slewing output gear is mounted on said inner ring; said at least one arc-shaped gear box is mounted on said outer ring; and said drive output gear engages said slewing output gear from an inner curve of said at least one arc-shaped gear box.

7. The toroidal slewing drive according to claim 1 and wherein said motor is a brushed or a brushless motor.

8. The toroidal slewing drive according to claim 1 wherein a torque or a speed reduction of said toroidal slewing drive is a function of a depth of said upper gear slot and/or said lower gear slot.

9. The toroidal slewing drive according to claim 1 wherein at least a diameter of said drive output gear is larger than a distance between an outer curve and an inner curve of said at least one arc-shaped gear box and at least a portion of said drive output gear occupies at least a portion of at least one of said upper gear slot and said lower gear slot.

10. The toroidal slewing drive according to claim 1 wherein at least a diameter of said at least one of said plurality of cluster gears is larger than a distance between an outer curve and an inner curve of said at least one arc-shaped gear box.

* * * * *